Jan. 6, 1948.  J. S. ADAMS  2,434,031
ANIMAL TRAP
Filed March 23, 1945
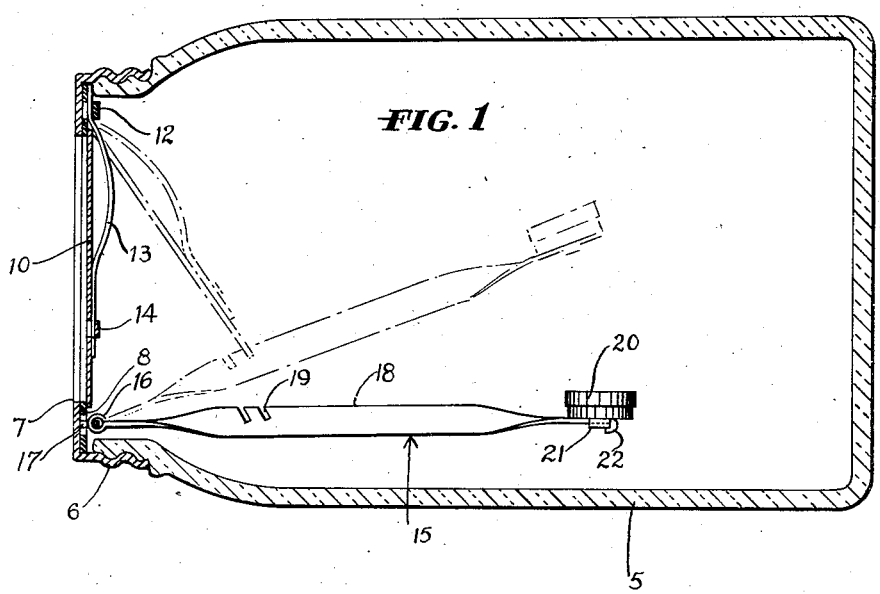
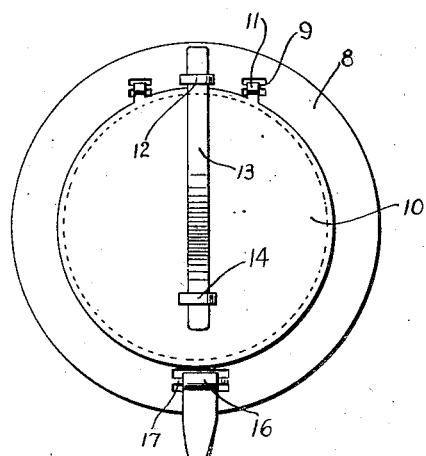
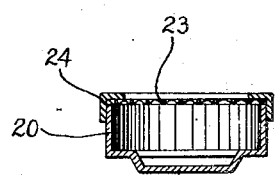
Inventor
Joseph S. Adams,
By
Attorneys Patented Jan. 6, 1948

2,434,031

UNITED STATES PATENT OFFICE 2,434,031

ANIMAL TRAP

Joseph S. Adams, Greenwood, Ark.

Application March 23, 1945, Serial No. 584,291

4 Claims. (Cl. 43—61)

The present invention relates to new and useful improvements in animal traps of a type adapted for use in catching mice and other small rodents.

An important object of the present invention is to provide means for converting a standard fruit jar into an efficient animal trap.

A further object of the invention is to provide an animal trap of this character formed from a fruit jar and including a cap having an opening therein and provided with a spring-actuated swinging door and providing trigger means for securing the door in its open position.

A further object of the invention is to provide a bait holder on the trigger and positioned within the jar for releasing the trigger by the animal attempting to reach the bait and also in which the bait holder is constructed to prevent the animal from eating the bait after the animal has been caught in the trap.

A still further object is to provide a device of this character of simple and practical construction, which is efficient and reliable in operation, relatively inexpensive to manufacture, and otherwise well adapted for the purposes for which the same is intended.

Other objects and advantages reside in the details of construction and operation, as more fully hereinafter described and claimed, reference being had to the drawing forming part hereof, wherein like numerals refer to like parts throughout, and in which:

Figure 1 is a longitudinal sectional view of a fruit jar showing the same equipped for use as a trap.

Figure 2 is a rear elevational view of the swinging door for closing the jar, and with the trigger shown released therefrom.

Figure 3 is a sectional view through the bait holder.

Referring now to the drawing in detail, wherein for the purpose of illustration I have disclosed a preferred embodiment of my invention, the numeral 5 designates a conventional form of fruit jar to the neck of which a cap 6 is threaded, the ring having a central opening 7 forming an entrance to the jar.

An annular member or ring 8 is held against the outer edge of the jar by means of the cap 6, the ring 8 having a pair of elongated lugs 9 struck therefrom adjacent one edge and to which a door 10 is pivotally attached by means of hinge members 11, the door being mounted for swinging inwardly of the jar into an open position and adapted for swinging against the inside of the ring 8 into its closed position.

A lug 12 is also struck from the ring 8 between the lugs 9 and under which one end of a leaf spring 13 is frictionally held under tension, the spring extending transversely behind the door 10 and having its other end secured thereto by a lug 14 struck from the door and under which the spring is inserted, the ends of the spring being frictionally held against movement by the lugs 12 and 14 so that upon an opening movement of the door, the spring will be held under tension to exert its influence upon the door for closing the latter.

The door 10 is secured in its open position by means of a trigger 15 of strap material having one end rolled to form an eye 16 which is pivotally mounted on a lug 17 struck from the ring 8 at its side substantially diametrically opposite from the lugs 9.

The trigger 15 projects inwardly of the jar 5 and has its intermediate portion twisted to provide an upstanding edge 18 in which one or more notches 19 are formed and adapted for receiving the free edge of the door 10 in frictional engagement therewith, whereby to secure the door in its open position, as shown by the dotted line in Figure 1 of the drawing.

A bait holder 20 in the form of an open pan is secured at the free end of the trigger 15, the bottom of the pan having a downwardly struck lug 21 receiving the free end of the trigger which is bent downwardly under the lug, as indicated at 22, to secure the pan in position on the trigger.

The top of the pan 20 is closed by a screen 23 held in place by a ring 24 engaged over the upper edge of the pan, whereby to prevent the animal from obtaining the bait held in the holder.

In the operation of the device, the ring 8 is placed in position under the cap 6 at the open end of the jar and with the hinged edge of the door 10 uppermost.

In order to set the trap, the door 10 is swung inwardly with its lower edge engaged in one of the notches 19 of the trigger 15, whereby the door will be held in its open position, as shown by the dotted line in Figure 1 of the drawing.

The animal is permitted to enter the opening 7 under the door 10 and when an attempt is made to reach the bait in the bait holder 20, the trigger 15 will be released and the spring 13 will close the door 10, thus trapping the animal in the jar.

While the foregoing may be considered a preferred embodiment of the invention, it should be understood that various changes in design and construction may be resorted to provided they are such as to properly fall within the scope of the invention as herein claimed.

Having thus described the invention, what I claim is:

1. An animal trap comprising a container having one end open, a cap having an opening therein and adapted for attaching at the open end of the container, an annular member between the top rim of the container and the cap, a pair of lugs formed on the member, a door pivotally attached to said lugs and adapted to close the opening in the cap, and a trigger pivoted at one end to the member and projecting into the container and adapted for releasably engaging and holding the door in open position.

2. An animal trap comprising a container having one end open, a cap having an opening therein and adapted for attaching at the open end of the container, an annular member between the top rim of the container and the cap, a pair of lugs formed on the member, a door pivotally attached to said lugs and adapted to close the opening in the cap, a lug formed on the door, another lug formed on the member, spring means frictionally held by said last-named lugs and exerting its influence on the door to close the door, a further lug formed on the member, and a trigger pivoted at one end to said further lug and projecting into the container and adapted for releasably engaging and holding the door in open position.

3. An animal trap comprising a container having one end open, a cap having an opening therein and adapted for attaching at the open end of the container, an annular member between the top rim of the container and the cap, a pair of lugs formed on the member, a door pivoted at one edge to said lugs and adapted to close the opening in the cap, a blade spring frictionally engaging the door and the member and exerting its influence on the door to close the door, another lug formed on the member, and a trigger pivoted at one end to the last-named lug and projecting into the container, said trigger having a notch in its upper edge adapted to receive and releasably hold the door in open position.

4. An animal trap comprising a container having an end open, a cap having an opening therein and adapted for attaching at the open end of the container, an annular member between the top rim of the container and the cap, a pair of lugs formed on the member, a door pivoted at one edge to said lugs and adapted to close the opening in the cap, spring means frictionally engaging the member and the door and exerting its influence on the door to close the door, another lug formed on the member, a trigger pivoted at one end to the last-named lug and projecting into the container, said trigger having a notch in its upper edge adapted to receive and releasably hold the door in open position, and a bait holder on the trigger at its inner end.

JOSEPH S. ADAMS.

REFERENCES CITED

The following references are of record in the file of this patent:

UNITED STATES PATENTS

| Number | Name | Date |
|---|---|---|
| 1,033,761 | Kampfe | July 23, 1912 |
| 1,187,793 | Thompson | June 20, 1916 |
| 1,539,000 | Peters | May 26, 1925 |
| 1,996,872 | Long | Apr. 9, 1935 |
| 2,023,427 | Marsh | Dec. 10, 1935 |